US012550902B2

(12) United States Patent
Martins Fonseca Reis et al.

(10) Patent No.: US 12,550,902 B2
(45) Date of Patent: Feb. 17, 2026

(54) METHOD FOR PREPARING A FORMULATION FOR INDUCING AN IMMUNE RESPONSE OF A PLANT TO A PATHOGEN, AND FORMULATION

(71) Applicant: GÊNICA INOVAÇÃO BIOTECNOLÓGICA S.A., Piracicaba (BR)

(72) Inventors: Fernando Martins Fonseca Reis, São Paulo (BR); Gustavo Henrique Recchia, São Paulo (BR)

(73) Assignee: GÊNICA INOVAÇÃO BIOTECNOLÓGICA S.A., Piracicaba (BR)

( * ) Notice: Subject to any disclaimer, the term of this patent is extended or adjusted under 35 U.S.C. 154(b) by 689 days.

(21) Appl. No.: 17/909,486

(22) PCT Filed: Mar. 4, 2020

(86) PCT No.: PCT/BR2020/050068
§ 371 (c)(1),
(2) Date: Mar. 2, 2023

(87) PCT Pub. No.: WO2021/174322
PCT Pub. Date: Sep. 10, 2021

(65) Prior Publication Data

US 2025/0255309 A1 Aug. 14, 2025

(51) Int. Cl.

| | |
|---|---|
| ***A01N 63/30*** | (2020.01) |
| ***A01N 43/16*** | (2006.01) |
| ***A01P 3/00*** | (2006.01) |
| ***C12N 9/18*** | (2006.01) |
| ***C12N 9/24*** | (2006.01) |
| ***C12P 19/04*** | (2006.01) |

(52) U.S. Cl.
CPC ............ *A01N 63/30* (2020.01); *A01N 43/16* (2013.01); *A01P 3/00* (2021.08); *C12N 9/18* (2013.01); *C12N 9/2402* (2013.01); *C12P 19/04* (2013.01); *C12Y 301/01011* (2013.01); *C12Y 302/01015* (2013.01)

(58) Field of Classification Search
CPC ........... A01N 63/30; A01N 43/16; A01P 3/00; C12N 9/18; C12N 9/2402; C12P 19/04; C12Y 301/01011; C12Y 302/01015
See application file for complete search history.

(56) References Cited

U.S. PATENT DOCUMENTS

| | | | | |
|---|---|---|---|---|
| 8,916,182 B2 | 12/2014 | Van Cutsem | | |
| 2010/0087369 A1* | 4/2010 | Cutsem | .................. | A61P 17/02 71/11 |

FOREIGN PATENT DOCUMENTS

| | | | |
|---|---|---|---|
| EP | 3005872 A1 * | 4/2016 | ................ C08L 5/00 |
| WO | WO-2019110538 A1 * | 6/2019 | ............ A01N 65/00 |

OTHER PUBLICATIONS

Ferrari et al.; Oligogalacturonides: plant damage-associated molecular patterns and regulators of growth and development; Frontiers in Plant Science; 4, 49, 2013, 1-9 (Year: 2013).*
Ferrari, S. et al. "Oligogalacturonides: plant damage-associated molecular patterns and regulators of growth and development". Frontiers in Plant Science, vol. 04, pp. 1-9, (Mar. 13, 2013).
International Search Report issued in PCT /BR2020/050068 Apr. 9, 2020.
Nikolic, et al., "Hydrolysis of Apple Pectin by the Coordinated Activity of Pectic Enzymes," Food Chemistry, Elsevier Ltd, NL, Aug. 12, 2006, vol. 101, No. 1, pp. 1-9, DOI: 10.1016/J.FOODCHEM.2005.12.053, ISSN 0308-8146, XP005754140.
Simpson S.D., et al., "Short Chain Oligogalacturonides Induce Ethylene Production and Expression of the Gene Encoding Aminocyclopropane 1-carboxylic Acid Oxidase in Tomato Plants," Glycobiology, US, Jun. 1, 1998, vol. 8, No. 6, pp. 579-583, DOI: 10.1093/glycob/8.6.579, ISSN 0959-6658, XP055446374.
Extended European Search Report for European Application No. 20922531.7, dated Nov. 13, 2023, 5 Pages.

* cited by examiner

*Primary Examiner* — Robert A Wax
*Assistant Examiner* — John W Lippert, III
(74) *Attorney, Agent, or Firm* — Blank Rome LLP

(57) ABSTRACT

This invention refers to a method to prepare a formulation having as active ingredients straight chain oligogalacturonide compounds of galacturonic [1→4]-α-D-acid residues with Polymerization Degree between 3-8 units. This formulation is intended for the foliar treatment of a plant by inducing the acquired systemic resistance (ASR), decreasing its susceptibility to pathogen *Phakopsora pachyrhiz*, which causes the disease, commonly known as Asian rust.

7 Claims, 5 Drawing Sheets

METHOD FOR PREPARING A FORMULATION FOR INDUCING AN IMMUNE RESPONSE OF A PLANT TO A PATHOGEN, AND FORMULATION

TECHNICAL FIELD

This invention refers to a method to prepare a formulation having as active ingredients straight chain oligogalacturonide compounds of galacturonic [1→4]-α-D-acid residues with Polymerization Degree between 3-8 units. This formulation is intended for the foliar treatment of a plant by inducing the acquired systemic resistance (ASR), decreasing its susceptibility to pathogen *Phakopsora pachyrhizi*, which causes the disease, commonly known as Asian Soybean Rust.

INVENTION BACKGROUND

Currently, the Asian rust control is conducted by using the following methods: follow the fallowing (period of at least 60 days without live soybean plants in the field); use cultivars with resistance gene(s); start sowing in the beginning of the recommended time; use early cultivars (escape); and apply chemical fungicides.

Such chemical control has been made by using site-specific fungicides (which act on a single point of the fungus metabolism), and multi-site (acting in more than one point of the fungus metabolism). Once such fungicides are specific in their toxicity, they can be absorbed by the plant and tend to present systemic properties (McGrath, 2004; Technical Circular Letter 144 by EMBRAPA).

The current fungicides belong to the following groups: demethylation inhibitors (DMI, "triazoles"—tebuconazole, cyproconazole, prothioconazole, difenoconazole, epoxiconazole and tetraconazole), quinine outside inhibitors (QOI, "strobilurins"—azoxystrobin, trifloxystrobin, picoxystrobin, metominostrobin and pyraclostrobin), succinate dehygrogenase inhibitors (SDHI, "carboxamides"—fluxapyroxad, bixafene, benzovindiflupir, fluindapir and impirfluxam), dithiocarbamate (mancozeb), chloronitrile (chlorothalonil) and inorganic (copper oxychloride) (Godoy et al., 2017a; Technical Circular 138 by EMBRAPA). The number of registered fungicides for the control of Asian rust has increased from five in 2002 to 117 in 2015 (Godoy et al., 2016).

Since the first years of use for disease control, the fungicides have intensively differentiated their efficacy, being that resistant populations of *Phakopsora pachyrhizii* less sensitive to such molecules are frequently identified (FRAC, 2017; Klosowski et al., 2015; Schmitz et al., 2013; Simões et al., 2017). In addition, the strong dependence of such tool is a continuous source of concern with respect to the risks to the applicator's and the environment health. Among the criteria adopted for application, the following is recommended: the use or more than one group of fungicides per cycle, with different modes of action; to prioritize the applications during the flourishing, pod formation and grain filling stages, with view to the periods of increased susceptibility; under severe epidemic conditions, perform from three to five applications at 10-day intervals (Sinclair and Hartman, 1995); and conduct preventive applications still in the vegetation period, in the pre-closure of the sowing lines, considering the climate and foreseeing the infection (Deuner et al., 2009).

On the other hand, the oligogalacturonides (hereinafter also referred to by their acronym OGs) have shown the capacity to elicit several defense responses in the plant, including the induction of transcription of genes that are essential for this process (Ferrari et al. 2003). In the plant, the degradation of the pectin which composes the cell wall by invading microorganisms results in the release of such oligomers of galacturonic [1→4]-α-D-acid residues, the accumulation of which will trigger such defense processes. However, the OGs have also shown to affect several aspects of the plants growth and development (Darvill et al., 1992), such as the elongation of pea stem segments (Branca et al., 1988), the flourishing (Marfa et al., 1991) and the organogenesis of roots in tobacco explants (Bellicampi et al., 1993), a process associated with the OGs antagonism with phytohormone auxin. In addition, the OGs are also considered as endogenous signs when released at low quantity as a consequence of the cell wall remodeling during the development of the vegetable cells (Ferrari et al., 2003). Consequently, the form on which the plants can discriminate between low physiological doses of OGs and high quantities produced during the interaction with the pathogens was not yet duly clarified. Thus, it is crucial to follow the dosage and application positioning recommendations so that important aspects of the plant development and preparation are not negatively affected.

In *Arabidopsis* seedling, the responses triggered by the OGs overlap those activated by MAMPs (microbial associated molecular patterns). The transcriptomes of seedlings treated with OGs and flg22 (peptide related to the active epitope of flagellin), indicate a wide overlap of responses in the first moments following treatment (30-60 min.). Such elicitors activate a series of responses which are independent from the ethylene-, salicylic acid-(SA) and jasmonate-(JA) mediated signaling pathways and induce the phosphorylation of two MAP Kinase proteins, AtMPK3 and AtMPK6, the second one being necessary for the early expression of defense genes and to induce resistance against pathogen *Botrytis cinerea*. In addition, the OGs and flg22 produce an oxidative response mediated by enzyme (NADPH)-oxidase AtRbohD, which is partially responsible for the subsequent deposition of callose.

The in vivo preparation of OGs by *Arabidosis* plants was explored by expressing a chimeric protein derived from the fusion of a polygalacturonase obtained from fungus *Fusarium phyllophillum* (FpPG) and from a PGIP of *Phaseolus vulgaris* (PvPGIP2). By expressing the chimeric construction under the control of promoters regulated by β-estradiol and by preserved gene R PR-1, active OGs were accumulated, with the Polymerization Degree ranging from 6-13, extending the resistant to the attach of fungus *Botrytis cinerea* and bacteria *Pseudomonas syringae* and *Pectobacterium carotovorum.*

In face of the above mentioned considerations, it was verified the need for large scale in vitro synthesis of OGs with view to the formulation of a resistance inducing product for the foliar treatment of a culture of agricultural interest, such as, for example, soybean.

There isn't in the state-of-the-art, any OGs intended for the induction of a systemic immune response in the soybean culture, to decrease the susceptibility of the culture to attach by *Phakopsora pachyrhizi*, the fungus which causes Asian rust. In addition, there are no reports of commercial products with OGs as active ingredient.

SUMMARY DESCRIPTION OF THE INVENTION

Thus, the object of this invention is to provide a method to prepare a formulation containing galacturonic [1→4]-α-

D-acid oligomers, with Polymerization Degree between 3-8, for the foliar treatment of plants in the phenological development stages where they are more susceptible to the pathogen attack. The formulation elicits a wide range of defense responses which include the accumulation of phytoalexines, glucanases and chitinases, callose deposition, of oxygen and nitric oxide reactive species.

This invention does not refer to an alternative to the conventional chemical treatments currently available in the market. It provides an additional tool for the disease control, once it allows the desired control levels to be reached with a lower number of chemical fungicide applications per culture cycle.

This invention refers to a method to prepare a formulation intended to induced an immune response by a plant to a pathogen, comprising the steps of:

(a) purifying oligogalacturonide compounds, from the product of the partial enzymatic hydrolysis of polygalacturonic acid during the pectin refining process, on which the hydrolysis reaction is conducted by a pectinase complex (pectin methylesterases, endopolygalacturonases and exopolygalacturonases), obtained from *Aspergillus niger*, at a temperature ranging from 26° C. to 36° C., stirring ranging from 100 to 200 rpm and pH between 3.8 and 4.5;
(b) boiling the obtained solution at a temperature of 100° C. for 10 min. for enzymatic inactivation;
(c) diluting the obtained solution at 0.5% with 50 mM sodium acetate solution;
(d) adding ethanol to the obtained solution, obtaining a solution with a concentration of 11%;
(e) maintaining the solution of step (d) incubated for 16 hours at a temperature of 4° C. so as to precipitate the oligogalacturonides;
(f) centrifuging the solution of step (e) at 30,000 g for 30 min., obtaining a formulation containing powdered oligogalacturonides and soluble in water;
(g) re-suspending the compound in water so as to obtain a solution with a concentration of 1 $mg \cdot mL^{-1} \cdot ha^{-1}$; and
(h) applying the compound in a plant susceptible to a pathogen.

During step (a) of the method of this invention the enzymatic concentration is 100 U, the temperature is 30° C., stirring is at 150 rpm and pH is 4.00 to 4.05.

The biotrophic pathogen to be treated by the method of this invention is *Phakopsora pachyrhizi* and the plant to be treated is preferably soybean.

Through the method of this invention a formulation is obtained comprising, as the active ingredient, the compound of molecular structure

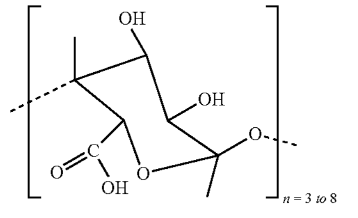

which refers to straight chain oligogalacturonide compounds of galacturonic [1→4]-α-D-acid residues with Polymerization Degree between 3-8 (Chemical formula: $(C_6H_8O_6)_n$).

The concerned formulation further comprises:

from 70% to 80% in weight of inactive polygalacturonic acid;
from 10% to 15% in weight of active fraction of oligomers with Polymerization Degree between 3-8 units;
from 10% to 12% of sodium acetate;
from 0.1% to 0.5% in weight of inactivated enzyme composed by pectinase complex of pectin methylesterases, endo- and exo-polygalacturonases, isolated from *Aspergillus niger*; and
from 0.01% to 0.05% in weight of inactivated BSA carrier protein.

The formulation preferably comprises:

74.71% in weight of inactive polygalacturonic acid;
14.01% in weight of active fraction of oligomers with Polymerization Degree between 3-8 units;
10.99% in weight of sodium acetate;
0.26% in weight of inactivated enzyme composed by pectinase complex of pectin methylesterases, endo- and exo-polygalacturonases, isolated from *Aspergillus niger*; and
0.03% in weight of inactivated BSA carrier protein.

The formulation of this invention is applied on a plant to be treated eliciting a defense response in the plant by inducing the transcription of genes that are essential for this process.

Most of the defense responses and effects on the vegetable development exercised by the OGs require a specific Polymerization Degree. Thus, it is evident that in order to activate specific response standards, OGs with also specific Polymerization Degree are required, being that for this proposal it is established that OGs with a Polymerization Degree between 3-8 are required to activate the immune response in soybean able to reduce the progression of the infection by fungus *Phakopsora pachyrhizii*, responsible for causing the Asian soybean rust disease. It is important to emphasize that the Polymerization Degree between 3-8 presents an inducing action of resistance in face of other diseases caused by the infection through microorganisms, especially those, the parasitism of which has a biotrophic character, not only with focus on the soybean culture but, also, other cultures of agricultural interest.

Finally, this invention is focused on the development of a single product, intended to induce resistance. In addition, the formulation obtained herein can be incorporated as an additive for the formulation of other commercial products such as fertilizers, growth inducers or even fungicides.

DETAILED DESCRIPTION OF THE INVENTION

Figure 1:
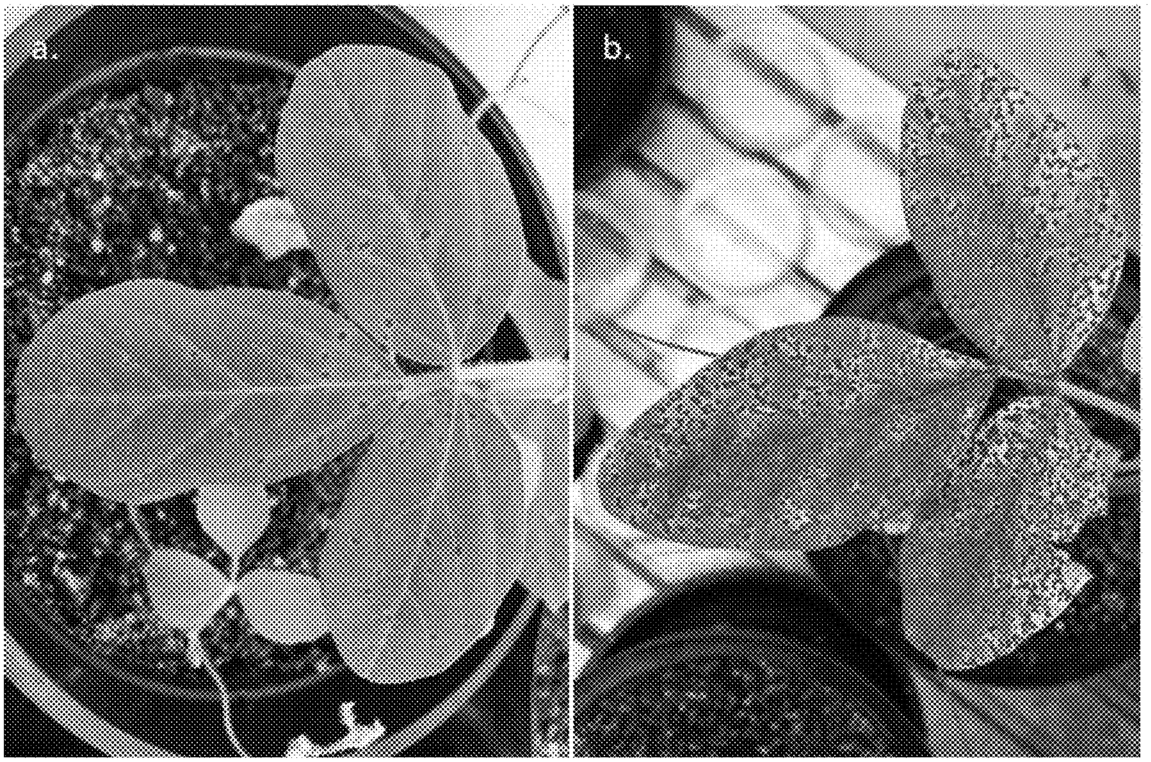
FIG. 1—Photos of Conquista-MG cultivar plants 30 days after the application of the oligomer formulation obtained by this invention and inoculation as a suspension containing $5 \times 10^5$ spores/ml of *Phakopsora pachyrhizi.*

As previously mention, there was a need to develop an innovative, profitable and safe solution for the control and handling of the Asian soybean rust. Thus, this invention discusses the methods to obtain an oligomer formulation which activate the defense mechanisms of the plant against the imminent attack of the pathogen, creating an additional tool to handle with the disease which allows to decrease the number of fungicide applications. In this case, the focus is no longer the chemical control of the inoculum conducted by the traditional fungicides (with high toxicity potential and which pose risk to the human, animal and environment health), but the plant. Thus, the risks inherent to the selection of resistant populations of *Phakopsora pachyrhizi* are decreased due to the continuous exposure to the same groups of molecules which constitute the formulation base of such fungicides.

Thus, this invention was developed with view to a method to manufacture an oligomer formulation with straight chain compounds of galacturonic [1→4]-α-D-acid residues with Polymerization Degree between 3-8 units.

Such oligomer formulation obtained by the concerned method is preferably a concentrated suspension. However, other formulations such as solid product (granules or Wettable powder), concentrated emulsion, among others, intended for foliar application in soybean culture, inducing resistance in the plant in face of the attack by pathogen *Phakopsora pachyrhizi*, can also be contemplated.

It is important to emphasize that although the oligomer formulation shows potential to activate systemic immune responses, this type of response tends to have a transitory character, requiring a continuous exposure to the effector molecule so that it lasts for a longer period. However, oligomers have another crucial role in the vegetable physiology. Being a direct product of pectin degradation, essential compound of the cell wall. Apoplastic variations in the concentration of such molecules may activate the transduction of cytoplasmic signs which directly affect the expression of genes related to the cellular development, with potential impact on the plant development and preparation. Thus, it is crucial to pay attention to the final product concentration in solution, and that the applications are conducted only in the periods of higher susceptibility of the culture to the pathogen in order to avoid an overload to the plant—transition from vegetative to reproductive (V7/8), flourishing (R1), pod formation (R3) and grain filling (R5).

As the treatment focus is the plant, not the fungus, it is essential that the chemical control with fungicides, although at lower scale, is still maintained so as to prevent an increase of the inoculums pressure in the field. Such strategy provides an additional tool in the fight against the disease, once it allows the desired control levels to be reached with a lower number of chemical fungicide applications per culture cycle, decreasing the negative impact caused by phytotoxicity, risk to human health and environmental contamination.

Conducted Tests

All the tests were conducted with soybean plants maintained in controlled growth chambers (24±1° C., photoperiod 14/10 hours, light intensity of 280 $\mu mol \cdot m^{-2} \cdot s^{-1}$), the foliar applications of the compound (1 $mg \cdot ml^{-1}$) being conducted with a manual sprayer, in stage V4 of phenological development of the plant, around 12 hours before inoculation with solution of $5 \times 10^5$ spores/ml of *Phakopsora pachyrhizi*.

The plants were followed-up on a daily basis throughout the experimental period, being the visual scoring scale proposed by Godoy et al. (2006), employed in order to verify the disease severity progression (%). It is worth emphasizing that for new proofs of concept, the plants were maintained up to the flourishing stage (R1) once the growth chamber size was not fit for plants beyond such development phase.

The Control plants are those not treated with the oligomer formulation obtained by this invention or fungicide.

Test 1

Plants from cultivar Conquista-MG, known to be very susceptible to the disease, were submitted. 11 days after inoculation, only the pustules present in the non-treated plants presented sporulation; plants treated with the oligomer formulation of this invention produced on average $26.3 \times 10^5$ spores/ml, while in the non-treated control plants, the count was $9.4 \times 10^6$ spores/ml of *Phakopsora pachyrhizi*, i.e., 3.58 times more spores.

Figure 2:
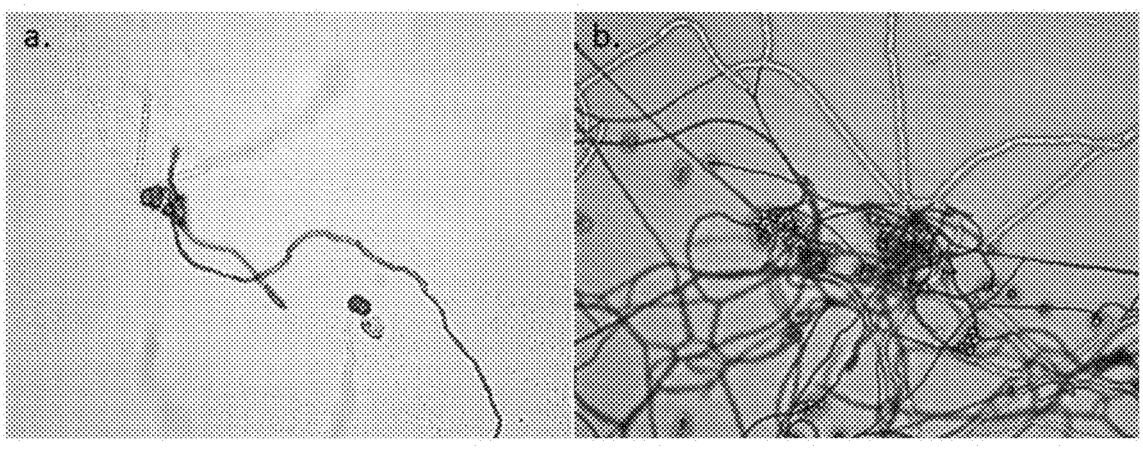
FIG. 2—Photos of *Phakopsora pachyrhizi* spores germination test in 1.5% agar-water medium collected 25 days after inoculation.

The variability of such spores was also estimated. The obtained spores were inoculated in agar-water medium and evaluated after 25 days. For plants treated with the oligomer formulation of this invention, only 49.6% of the spores sprouted (FIG. 2*a*), while for the non-treated control plants such rate was higher, 73% (FIG. 2*b*).

30 days after the treatment, the plants from cultivar Conquista-MG treated with the oligomer formulation of this invention presented a maximum of 7% of the foliar area with lesions (FIG. 1*a*), while the non-treated control plants presented up to 78% of the area with lesions (FIG. 1*b*).

Test 2

Figure 4:
FIG. 4—Photos of cultivar Monsoy IPRO M8372 IPRO plants after 19 days of treatment with the oligomer formulation obtained by this invention.

Plants from cultivar IPRO M8372, with intermediate potential of susceptibility to the disease, were submitted. At the end of the experiment (19 days), all the inoculated plants exhibited some disease symptoms. However, the disease severity showed to be different in both treatments. For plants treated with the oligomer formulation of this invention, 80% of the contaminated leaves presented between 0.2-2% of their total areas with lesions (FIG. 4*a*), among the non-treated leaves, in their turn, 80% presented from 2-18% of their areas with lesions (FIG. 4*b*). The maximum contamination in treated leaves was 7%.

Test 3

Conducted in the region of Guarapuava (PR). Three compound application treatments were considered therein: (i) an application at pre-flourishing stage (V7/8), (ii) an application in the beginning of the pod forming stage (R3), and (iii) two applications of the oligomer formulation of the present invention in both development stages (V7/8+R3), always concomitantly with chemical fungicides in compliance with the standard application calendar of the experimental area in the farm (Table 1).

TABLE 1

Fungicide application routine in agronomic efficiency test conducted in the region of the municipality of Guarapuava (PR) in the 2018/19 Crop.

Fungicide Applications

| Product | Date | Dose/ha |
|---|---|---|
| Fox and Cuprodil | Jan. 16, 2019 | 0.4 and 1.0 |
| Elatus and Sumilex and Bendazol | Jan. 29, 2019 | 0.2 and 0.5 and 1.0 |

TABLE 1-continued

Fungicide application routine in agronomic efficiency test conducted in the region of the municipality of Guarapuava (PR) in the 2018/19 Crop. Fungicide Applications

| Product | Date | Dose/ha |
|---|---|---|
| Cronnos and Bendazol and Cuprodil | Feb. 11, 2019 | 2.25 and 1.0 and 1.0 |
| Unizeb Gold and Nativo | Feb. 26, 2019 | 1.25 and 0.5 |

The adopted cultivar was K-5616. The experimental design system was parcels subdivided with randomization in factorial system. 24 parcels were defined, divided into four blocks, subdivided according to the phenological development stage of the plant where the application of the oligomer formulation obtained by this invention would be conducted. The sizes of the parcels (blocks) were 5×3 (m), containing 7 rows, being the two more external rows and 0.50 m of each side used as border to isolate the parcels. The treatments were fully randomized. An average population density of 300 thousand plants×$ha^{-1}$ was used. The final application dose of the oligomer formulation obtained by this invention was 1 mg/ml, corresponding to 16.8% in 100 L/ha.

Figure 3:
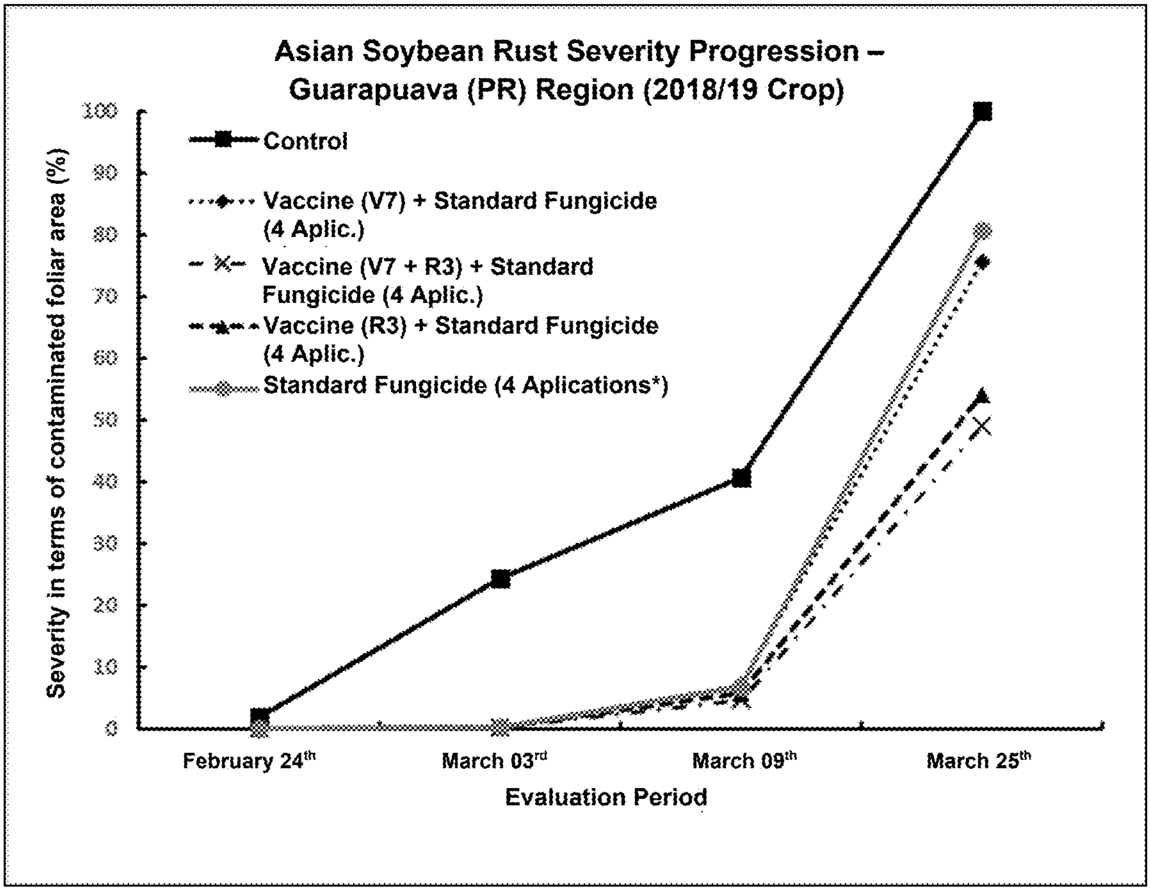
FIG. 3—Chart showing the Asian soybean rust severity progression curve in terms of percentage (%) of contaminated foliar area in plants of cultivar K-5616.

Due to the strong presence of the disease in the region, it was possible to collect disease severity data (%) over the months of February and March 2019. FIG. 3 presents the Asian soybean rust severity progression curve in terms of percentage (%) of contaminated foliar area in plants of cultivar K-5616.

The weekly evaluation was conducted according to the visual scoring scale proposed by Godoy et al. (2006), where five treatments were conducted: (i) control with no form of disease treatment; (ii) one application of the oligomer formulation obtained by this invention, in stage V7 of the plant development with four additional fungicide applications; (iii) two applications of the oligomer formulation obtained by this invention, in stages V7 and R3 of plant development with four additional fungicide applications; (iv) one application of the oligomer formulation obtained by this invention, in stage R3 of plant development with four additional fungicide applications; and (v) four fungicide applications.

For the other treatments, the parcels which received two applications of the oligomer formulation of this invention (V7/8+R3) concomitantly with the standard application of fungicides presented the lowest disease severity levels (49.1%). Single applications showed to be more efficient when conducted during the reproduction stage, when the plant is under higher inoculum pressure (54.3% for application in R3), being that the application only in V7/8 exhibited similar control levels (75.6%) in parcels where only the standard application of fungicides was conducted (80.7%).

Figure 5:
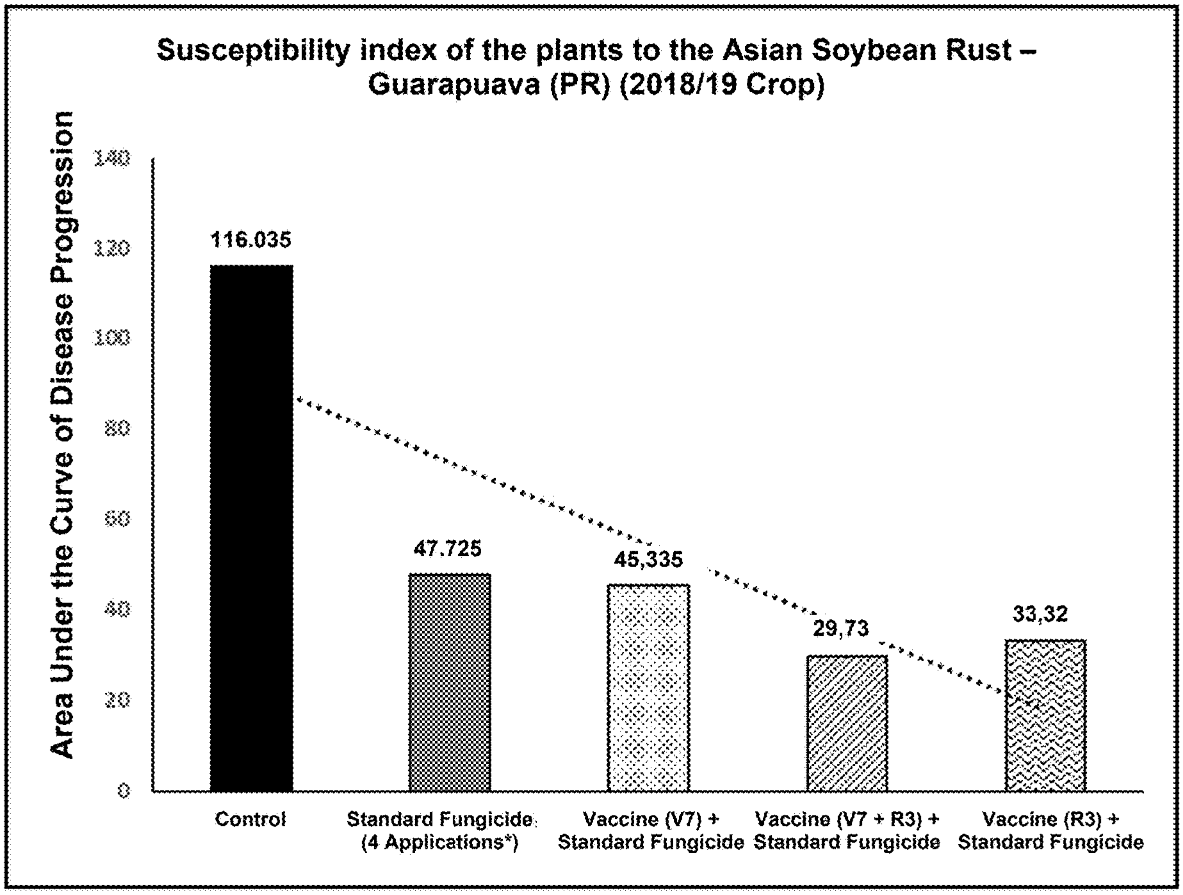
FIG. 5—Chart showing the calculation of the area under the curve of disease progression (AACPD) for the index which indicates the disease susceptibility level after the treatments in plants of cultivar K-5616.

FIG. 5 illustrates the result of the calculation of the area under the curve of disease progression (AACPD) for the index which indicates the disease susceptibility level after the treatments in plants of cultivar K-5616 grown in the region of the municipality of Guarapuava (PR) during the 2018/19 Crop.

Figure 6:
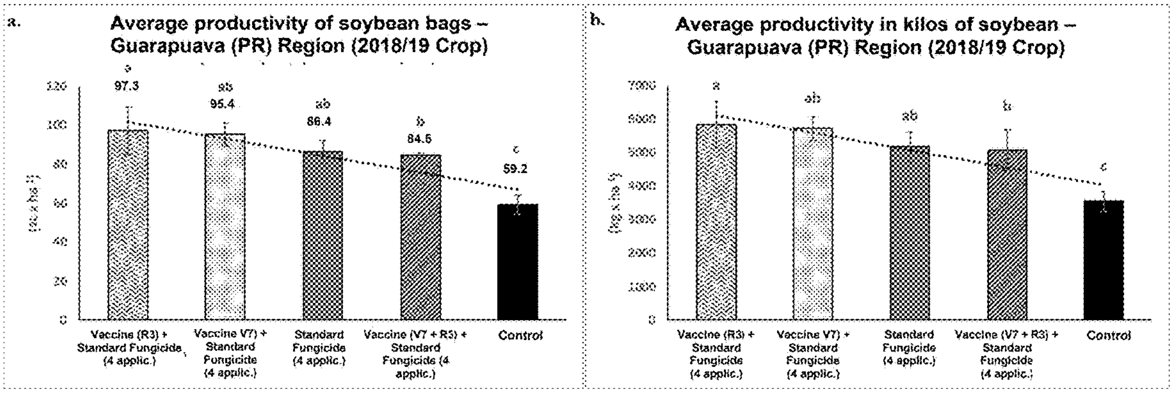
FIG. 6—Chart showing the average productivity data of cultivar K-5616 obtained in the study area in Guarapuava (PR) for the 2018/19 Crop.

FIG. 6 presents the average productivity data of cultivar K-5616 obtained in the study area in Guarapuava (PR) for the 2018/19 Crop. FIG. 6*a* shows the average Productivity in soybean bags per hectare of planted area (sc·$ha^{-1}$); FIG. 6*b* shows the average productivity in kilos of soybean per hectare of the planted area (kg·$ha^{-1}$).

Test 4

Conducted in the region of Piracicaba (SP), five compound application treatments were considered: (i) one application in the pre-flourishing stage (V7/8); (ii) one application in the beginning of the pod forming stage (R3), (iii) one application in the grain filling stage (R5); and (iv) and (v) two applications, in V7/8+R3, and in R3+R5, respectively.

In addition, parcels where only applications of the oligomer formulation of this invention were conducted, only one fungicide application (Fox®, Bayer) in R1, and parcels with both treatments, were adopted.

The cultivar adopted was Agroeste 3730 Intacta. The experimental design system was parcels subdivided with randomization in factorial system. 96 parcels were defined, divided into four blocks, subdivided according to the phenological development stage of the plant where the application of the oligomer formulation obtained by this invention would be conducted. The sizes of the parcels (blocks) were 5×3 (m), containing 7 rows, being the two more external rows and 0.50 m of each side used as border to isolate the parcels. The treatments were fully randomized. An average population density of 300 thousand plants·$ha^{-1}$ was used. The final application dose of the oligomer formulation obtained by this invention was 1 mg/ml, corresponding to 16.8% in 100 L/ha.

Due to the strong drought in the region during the first two weeks of December/2018, and over the entire month of January/2019, the plants suffered a strong impact on their development. With view to minimize the phytotoxicity effects as a result of the high temperatures, only one fungicide application was conducted in 13 February (0.4 L/ha). As a result of the rain intensification only at the end of the month of March/2019, the rust was only registered in the end of the crop development cycle (Mar. 16, 2019), being that only one disease severity evaluation (%) was possible.

Figure 7:
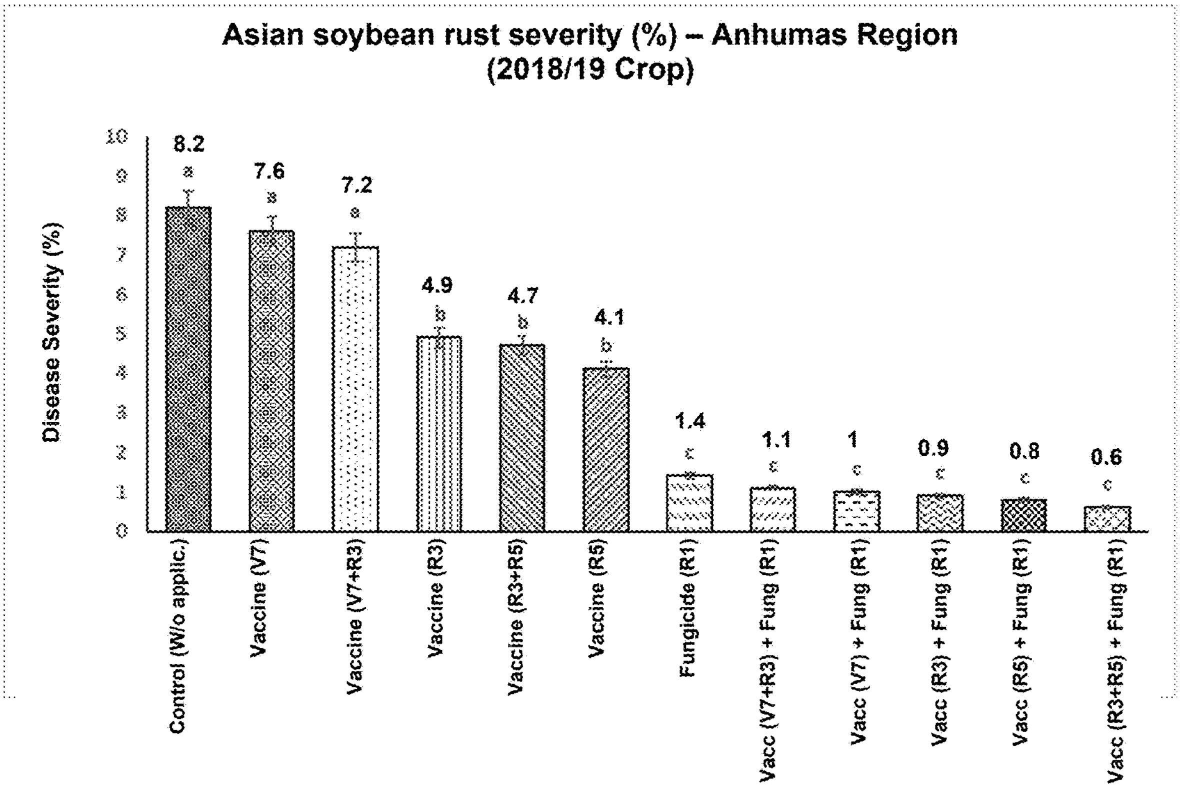
FIG. 7—Chart showing the Asian soybean rust severity degree in terms of percentage (%) of contaminated foliar area in plants of cultivar Agroeste 3730 Intacta.

Through the chart of FIG. 7, it is possible to verify the Asian soybean rust severity degree in terms of percentage (%) of contaminated foliar area in plants of cultivar Agroeste 3730 Intacta.

CONCLUSION

This data evidence that the soybean treatment with biologically active fractions of the oligomer formulation of this invention affects the colonization by *Phakopsora pachyrhizi*, with direct impact on the disease progression severity (%) in the field.

Therefore, it can be concluded that this invention is innovative and ecologically sustainable, once it makes use of a chemical elicitor which naturally occurs in plants for the treatment of a disease for which the handling is conducted almost exclusively based on chemical fungicides with high toxicity degree and which pose risks to the human, animal and environment health. The addition of this tool to the integrated handling techniques of the disease, particularly as a complement to the usual chemical control practices, provides the possibility to decrease the number of fungicide applications throughout the crop development cycle.

The invention claimed is:

1. A method to prepare a formulation to induce an immune response of a plant susceptible to a pathogen, characterized by the fact that it comprises:

(a) purifying oligogalacturonide compounds, from the product of the partial enzymatic hydrolysis of polygalacturonic acid during the pectin refining process, on which the hydrolysis reaction is conducted by a pectinase complex (pectin methylesterases, endopolygalacturonases and exopolygalacturonases), obtained from *Aspergillus niger*, at a temperature ranging from 26° C. to 36° C., stirring ranging from 100 to 200 rpm and pH between 3.8 and 4.5;

(b) boiling the obtained solution at a temperature of 100° C. for 10 min. for enzymatic inactivation;

(c) diluting the obtained solution at 0.5% with 50 mM sodium acetate solution;

(d) adding ethanol to the obtained solution, obtaining a solution with a concentration of 11%;

(e) maintaining the solution of step (d) incubated for 16 hours at a temperature of 4° C. so as to precipitate the oligogalacturonides;

(f) centrifuging the solution of step (e) at 30,000 g for 30 min., obtaining a formulation containing powdered oligogalacturonides and soluble in water;

(g) re-suspending the compound in water so as to obtain a solution with a concentration of 1 mg/mL.

2. The method according to claim 1, characterized by the fact that in step (a) the enzymatic concentration is 100 U, the temperature is 30° C., stirring is at 150 rpm and pH is of 4.00 to 4.05.

3. A formulation obtained by the method of claim 1 or 2 characterized by the fact that its active ingredient comprises oligomers of galacturonic [1→4]-α-D-acid residues, containing Polymerization Degree between 3-8 units.

4. The formulation, according to claim 3, characterized by the fact that it comprises:

from 70% to 80% in weight of inactive polygalacturonic acid;

from 10% to 15% in weight of active fraction of oligomers with Polymerization Degree between 3-8 units;

from 10% to 12% in weight of sodium acetate;

from 0.1% to 0.5% in weight of inactivated enzyme composed by pectinase complex of pectin methylesterases, endo- and exo-polygalacturonases, isolated from *Aspergillus niger*; and from 0.01% to 0.05% in weight of inactivated BSA carrier protein.

5. The formulation, according to claim 4, characterized by the fact that it comprises:

74.71% in weight of inactive polygalacturonic acid;

14.01% in weight of active fraction of oligomers with Polymerization Degree between 3-8 units;

10.99% in weight of sodium acetate;

0.26% in weight of inactivated enzyme composed by pectinase complex of pectin methylesterases, endo- and exo-polygalacturonases, isolated from *Aspergillus niger*; and 0.03% in weight of inactivated BSA carrier protein.

6. A method of inducing an immune response in a plant susceptible to a pathogen, the method comprising applying the formulation of claim 3 on the plant thereby eliciting a defense response to a possible pathogen by inducing the transcription of essential genes.

7. The method of claim 6, characterized by the fact that the pathogen is *Phakopsora pachyrhizi*.

* * * * *